May 30, 1939.  A. A. KRAMER  2,160,477
VEHICLE TANK
Original Filed Feb. 17, 1934   3 Sheets-Sheet 1

INVENTOR
ANDREW A. KRAMER
BY
Alfred R. Fuchs
ATTORNEY

May 30, 1939. A. A. KRAMER 2,160,477
VEHICLE TANK
Original Filed Feb. 17, 1934 3 Sheets-Sheet 2

INVENTOR
ANDREW A. KRAMER
BY Alfred R. Fuchs
ATTORNEY

May 30, 1939.　　　A. A. KRAMER　　　2,160,477
VEHICLE TANK
Original Filed Feb. 17, 1934　　3 Sheets-Sheet 3

INVENTOR
ANDREW A. KRAMER
BY Alfred R. Fuchs
ATTORNEY

Patented May 30, 1939

2,160,477

UNITED STATES PATENT OFFICE 2,160,477

VEHICLE TANK

Andrew A. Kramer, Kansas City, Mo.

Original application February 17, 1934, Serial No. 711,753. Divided and this application December 14, 1936, Serial No. 115,830

4 Claims. (Cl. 280—5)

My invention relates to vehicle tanks, and more particularly to tanks for vehicles having one end thereof mounted at a higher level than the other end thereof, this application being a division of my co-pending application Serial No. 711,753, filed February 17, 1934.

One of the important purposes of my invention is to provide a tank vehicle that has a low center of gravity, particularly when loaded, and which is exceptionally strong in construction and relatively cheap to manufacture, and light in weight. A low center of gravity in a tank has been previously obtained by providing an offset in the tank body so that one end thereof was shallower than the other end thereof, with a decided offset or break in the contour thereof between the portion of greater depth and the portion of lesser depth. This offset or break in the contour of the tank made it necessary to provide means for bracing the tank at said offset in order to make the same of sufficient strength to withstand the load at this point under conditions of use of the tank.

While my invention is particularly adapted for use as a semi-trailer tank, in conjunction with a pulling vehicle or tractor, it has advantages which make it capable of use on any vehicle under certain conditions.

It is a particular purpose of my invention to provide a vehicle tank of the above mentioned character, that is so constructed that the same will have maximum strength and light weight, along with a low center of gravity and a reduced cost, with maximum capacity for the tank, and at the same time have a neat and finished appearance when in position in the complete vehicle.

In order to accomplish the above mentioned purposes I have provided a vehicle tank that tapers in a lengthwise direction so that the smaller portion thereof is at one end thereof, and the larger portion at the other end thereof, with a gradual increase in cross section between said smaller and larger portions. Tanks with reduced end portions that have been previously known have had the reduced end portion provided with a flat bottom, or substantially flat bottom, making a decided break between the bottom and the remainder of the shell portion of the tank at the reduced end thereof, thus weakening the same and placing a seam at a point where leakage is most likely to occur. While it has been found desirable to make a tank of this character of round or circular cross section at one end thereof, and of partially elliptical and partially circular cross section at the other thereof, it may be made of elliptical cross section throughout its length, the important thing being that it is made of a cross section such that the shell portion is of gradual curvature, without any decided or sharp breaks therein from end to end thereof, either in a longitudinal direction or a transverse direction, and is of uniform maximum width from end to end thereof.

No matter what the type of tank may be, as far as its cross sectional shape is concerned, it preferably tapers gradually from end to end thereof so that there are no sharp offsets at any point therein, and so that the generally curving contour of the shell in cross section is maintained at all points along the length of the tank, to thus obtain the advantage of the inherent strength in a complete transversely curved tubular wall, that has no breaks or offsets therein. Thus it is a purpose of my invention to provide a tank that has a sloping bottom which slopes continuously from one end to the other end of the tank. This is particularly advantageous in lowering the center of gravity of the load in a semi-trailer or similar vehicle, and is also particularly advantageous in any vehicle tank, in providing ready flow of liquid toward the rear of the tank and where a tank is made for carrying certain liquids, such as milk, for example, it is very desirable, as it provides for the ready drainage of the tank, and avoids any sharp corners therein that might be objectionable for sanitary reasons.

It is a further purpose of my invention to provide a tank of the above mentioned character, which is so formed that the upper portion thereof is of substantially the same contour from end to end thereof and of the same height and maximum width, with the lower portion so shaped as to provide the taper in the tank, and the inclined bottom in the tank, in combination with means forming a skirting on the sides of the tank, such that the taper in the tank is not apparent to the observer of the vehicle, only the portion of the tank that is of uniform cross sectional contour throughout being visible above the top of the skirting, and thus creating the impression that the tank is of the same cross section from end to end thereof. This is particularly desirable in a semi-trailer vehicle, and it is one of the purposes of my invention to provide a skirting so constructed and arranged that the semi-trailer vehicle and the pulling vehicle will appear to be a unit, instead of two vehicles connected together. Preferably, the skirting is utilized as a housing for appurtenances that may be carried with the tank, or to house valves, or other supplemental containers, as may be desired. The forward end of the semi-trailer vehicle is rounded so that the same may be turned about the vertical axis of the fifth wheel structure, for supporting the same, to any angle that may be necessary in practice, without approaching the cab of the pulling vehicle any closer than when the semi-trailer tank is in longitudinal alignment with the longitudinal axis of the pulling vehicle, thus making it possible to put the tank closer to the cab than would otherwise be possible, and obtaining a more unified appearance for the semi-trailer and pulling vehicle.

It is a particular purpose of my invention to provide a tank of the above mentioned character, that is so constructed and braced that the same can be utilized as a semi-trailer tank, without the provision of a separate trailer frame, making it possible to mount the tank directly on trailer wheels and on a fifth wheel structure, thus obtaining a much lower center of gravity than when an additional vehicle frame is necessary. The inherent strength of a tank of the character described and the bracing means shown and described herein, make this possible.

Due to the inherent strength of the type of tank forming the subject matter of this invention, it is not absolutely necessary that internal and external bracing means be provided for said tank under all conditions, as is necessary in a semi-trailer tank with an offset therein. The size of the tank and the character of the load carried thereby would govern this to a certain extent, but my invention may be applied to a tank having transverse partitions dividing the same into compartments with transversely and longitudinally extending bracing means both internally and externally of the tank, to a double shell tank with bracing means between the shells only and no internal bracing means and no partitions or obstructions of any kind therein, and also to a single shell vehicle tank with either external or internal bracing means, as may be desired.

Other objects and advantages of my invention will appear as the description of the drawings proceeds. I desire to have it understood, however, that I do not intend to limit myself to the particular details shown or described, except as defined by the claims.

Figure 1:
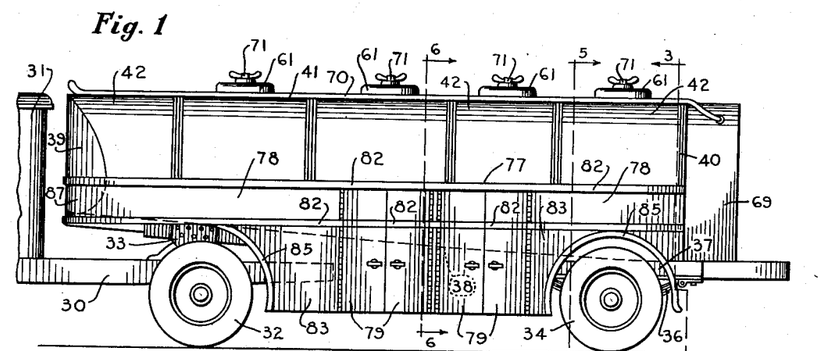
Fig. 1 is a view in side elevation of a semi-trailer tank vehicle embodying my improvements, the front portion of the pulling vehicle being broken away.

Referring in detail to the drawings, in Fig. 1 is shown a semi-trailer tank vehicle utilizing my invention in order to obtain maximum strength with low center of gravity and maximum capacity for a tank of this character. The pulling vehicle 30 is shown as having a cab 31, rear wheels 32, and a fifth wheel structure 33 mounted on the pulling vehicle. The semi-trailer tank vehicle is mounted directly on this fifth wheel structure and on a rear wheel assembly comprising the rear wheels 34, rear axle 35 and springs 36 secured to said rear axle 35 and to the angle members 37, forming part of the combined trailer tank and trailer frame, said trailer frame being a unit with the tank and constituting bracing means for the tank, there being no trailer frame utilized distinct from the tank body, thus aiding in providing a low center of gravity for the device. The trailer, of course, turns about the vertical axis of the fifth wheel structure as a center, relative to the pulling vehicle, and the semi-trailer vehicle must be so designed and constructed that it will not in any manner interfere with the turning of the pulling vehicle relative to the trailer, or in other words, the pulling vehicle frame and the rear wheels 32 of the pulling vehicle, must be free to turn under the trailer to any desired angular position of the longitudinal axis of the pulling vehicle relative to the longitudinal axis of the trailer.

While I have previously designed and shown and described in my Patent No. 1,815,625, patented July 21, 1931, and my Patent No. 1,886,197, patented November 1, 1932, vehicle tanks and semi-trailer tank vehicles, in which an offset in the under side of the tank was provided in order to obtain a low center of gravity for the load of the tank, and in which the trailer frame was entirely eliminated by providing a combined frame and tank bracing means, which accomplished a forward step in the art in providing a tank vehicle that had a much lower center of gravity than had been previously obtained by constructions known in the prior art, along with great strength and a considerable saving in weight, there are certain weaknesses in this structure, which could not be overcome in a tank with a decided offset therein, because of the loss of the advantage of having a tubular shell curved throughout any cross section thereof, such as a circular, elliptical, or partly elliptical and partly circular, shell of smooth curvature from end to end of the tank, would provide. It is well known that a certain amount of inherent strength is present in a tube, particularly one of circular cross section, or one curved so as to approach a circular cross section, such as an elliptical cross section, over what one with sharp offsets therein, such as a true rectangular cross section or a cross section having one or more flat sides, would provide. Also the sharp break in contour in a longitudinal direction, due to the sharp offset in the tank, made it necessary to very substantially brace the same at this offset to overcome the weakness developed at these points. This made it necessary to use a relatively heavy gauge sheet metal for the tank and for the bracing means. The present tank shown in Figs. 1 to 6, inclusive, is designed to provide maximum strength for heavy loads and maximum capacity, and at the same time as low a center of gravity, and as light an unloaded weight for the vehicle as is possible to obtain for a vehicle having a plurality of compartments along with the necessary strength for the load to be carried and for the rough usage to which the same would be subjected in actual use. In order to accomplish this purpose, the general contour of the tank is such that there are no sharp breaks or offsets in such contour in either a transverse or longitudinal direction.

Figure 2:
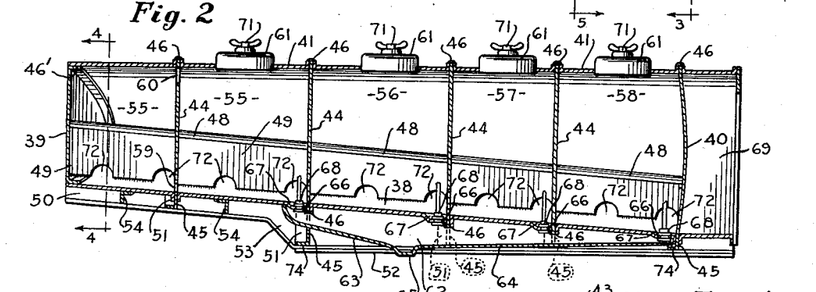
Fig. 2 is a longitudinal sectional view of the tank body utilized for said vehicle.

Referring to Fig. 2, it will be noted that the shell portion of the tank is of such shape that the bottom 38 thereof is inclined, or slopes downwardly, from the front wall 39 of the tank to the rear wall 40 of the tank proper, the inclination or slope of the bottom portion 38 being uniform from front to rear of the tank, while the top edge or uppermost portion 41 of said shell is normally horizontal, or in other words, is at the same height from the supporting surface on which the wheels 32 and 34 are mounted, such as the roadway, over the entire length of the tank.

Figures 3, 4:
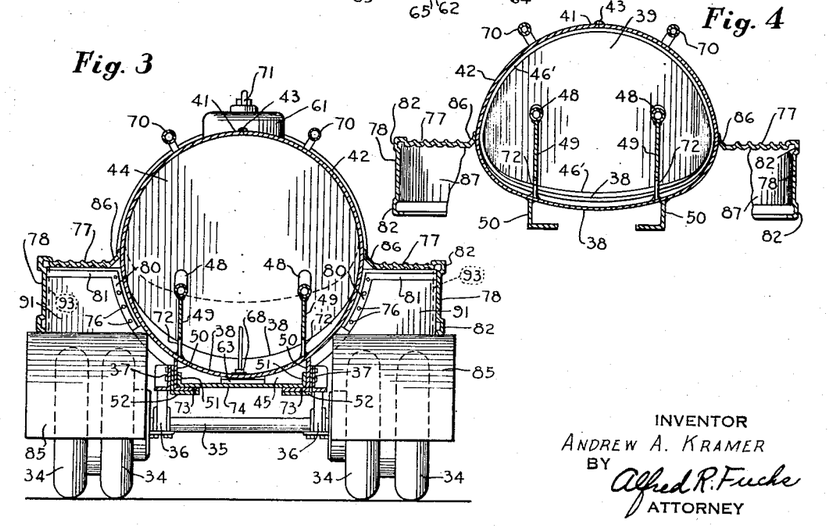
Fig. 3 is a section taken on the line 3—3 of Fig. 1, on an enlarged scale.
Fig. 4 is a section taken on the line 4—4 of Fig. 2, on an enlarged scale, partly broken away.

Upon reference to Fig. 3 it will be seen that at the rear end of the tank, the shell portion 42 is circular, or substantially a true cylinder. However, this is only true at the rearmost part of the tank, as the contour changes constantly until the front of the tank is reached, at which point the shell 42 has the upper portion thereof formed of a semi-cylindrical shape, or approximately a semi-cylindrical shape, and the lower portion thereof curved to a substantially semi-elliptical contour. The maximum transverse horizontal dimension, or width of the tank is the diameter of the cylinder forming the rear edge of the shell 42, and the maximum transverse horizontal dimension or width of the front end of the tank just rearwardly of the curved forward end 39, is also the diameter of the cylindrical portion at the rear edge of the tank. Thus the tank is of the same maximum width throughout, and the upper portion of the tank is of the same contour throughout, having the same radius of curvature throughout its cross section from end to end of the tank, but the lower portion thereof changes in contour constantly from rear to front of the tank so as to provide a tubular body of convex transverse curvature at any point in the length of the body where a transverse section thereof may be taken, giving the full benefit of such tubular convexity at all points in the length of the tank body, the cross sectional curvature of said lower portion being substantially semi-elliptical, all cross sections having the same length of horizontal axis, but the vertical axis decreasing from the rear toward the front of the tank.

In the form of the invention shown in Figs. 1 to 6, inclusive, the shell of the tank is made up of shell portions, or shell sections 42, which are each shaped to the curvature required to obtain the above mentioned cross sectional shape, being made out of a sheet, or sheets, of material which are suitably welded together into a tubular unit, each unit having the upper portion of uniform substantially semi-cylindrical curvature and a lower portion substantially semi-elliptical in curvature and tapering lengthwise, any seams being, preferably, located at the upper portion of the tank. Thus in Fig. 4 the seam 43 is shown as being at the top of the tank, which is a preferred location thereof, thus preventing any possibility of leakage at the seam.

The tank further comprises transversely extending sheets constituting partition members 44, and the rear end wall 40 is also one of said transverse sheets, the curved front wall 39 forming the forward head of the tank and the rear wall 40 forming the rear head of the tank. The rear head 40 is preferably dished slightly so as to have a slight concavity to strengthen and stiffen the same. The partition members 44 are provided with downwardly extending portions 45, as is also the rear head portion 40, while the sections or shell portions 42 are provided with outwardly flanged edges that are welded to the partition members 44, and the head 40 at said downwardly extending portions. The partitions 44, and the rear head 40 all extend slightly beyond the outer contour of the adjoining shell portions, and said shell portions are flanged slightly outwardly all around the edges thereof to provide a welded joint, as indicated at 46, at the junction of said shell portions, partitions and head. Said partitions 44 and said rear head 40 are also provided with laterally extending portions 47 that extend beyond the shell portion of the tank, to which suitable housing means or other appurtenances may be secured. The forward head 39 is flanged inwardly, as indicated at 46', and said head and the shell portion adjacent the same welded together.

Mounted within the tank and extending through the same from end to end thereof are provided the tubular members 48, these being inclined downwardly from the forward end of the tank to the rear end thereof, and extend through the rear head 40 of the tank, said tubular members 48 extending through the partitions 44 and being welded to said partitions and to the heads 39 and 40. Said tubular members 48 may serve as hose receptacles and are, preferably, provided with open ends at the rear thereof so that a hose may be inserted in each of said tubular members 48.

Cooperating with the tubular members to brace and stiffen the tank longitudinally are internal bracing means comprising the plate-like members 49 located in each section of the tank between the partitions 44 and between certain of said partitions 44 and the heads of the tank. Said plates 49 are welded at their top edges to the tubular member 48, and at the bottoms thereof to the bottom portion 38 of the shell of the tank, the same being shown as being welded at their lower edges to the inside of the shell of the tank. Thus these plates 49 collectively, serve as the webs of longitudinally extending I-beam-like members running lengthwise of the tank at an inclined angle substantially parallel to the bottom thereof, due to the fact that the shell portion of the tank and the tubular members 48, in cooperation with the plates 49, constitute what is, in effect, an I-beam. The plates 49 are welded to the plates 44 also, thus very materially bracing the tank internally thereof, said partitions 44 and said plates 49 constituting bracing means extending both transversely and longitudinally thereof. In this form of the invention this internal bracing means constitutes a portion of the integral framework that serves in lieu of a trailer framework in my semi-trailer tank vehicle.

Said framework also comprises an external portion integral with the tank, having also longitudinally and transversely extending members. The transversely extending members of the framework constitute the extended portions 45 of the partitions 44 and of the head 40. The longitudinally extending members of the framework comprise the longitudinally extending bracing members 50, which are nearly in vertical alignment with the plates 49, and which are welded to the bottom portion 38 of the shell 42 on the exterior thereof, and to the transverse bracing members 45 and to the flanges 51 provided on said transverse bracing members 45. Said members 50 also have flanges 73 that are welded to the flanges 74 on the members 45.

Angle members 52 are also provided that are welded to the angular members 50 to further brace the framework in a longitudinal direction. The angles 37, to which the springs 36 are secured, are bolted, riveted, or welded, or otherwise rigidly secured to the framework, of which said members 52 and 50 form a part. The members 50 are provided with an offset therein at 53 to provide for the turning of the wheels of the pulling vehicle under said longitudinally extending members of the external portion of said framework, the members 50 thus comprising a taller portion and a shorter portion connected by an offset. The members 52 terminate at said offset, extending only rearwardly therefrom. While the beam thus formed is shown as being of maximum height adjacent the offset at 53 in said frame, this is not absolutely a necessity, as the beams may be made of uniform height throughout, should this be desired, although it is obvious that for maximum strength, and to obtain a horizontal bottom edge for the rear wheel assembly mounting, the arrangement shown in Fig. 2 is desirable, as the height of the beam is the greatest where the vehicle is not supported directly on a wheeled support, or in other words, at a point between the wheeled supports. At the forward end of the tank the external portion of the integral framework is provided with a pair of transverse bracing members 54 that are shown as being made in the form of angles, which are utilized for mounting the upper portion of the fifth wheel structure 33 on the bottom side of the semi-trailer tank vehicle.

The tank shown is provided with a plurality of compartments by means of the partitions 44, there being four compartments shown in Fig. 2, these being numbered 55, 56, 57 and 58 in the drawings. The compartment 55 extends on both sides of the forward-most partition 44, this partition serving mainly to prevent splash and to strengthen the tank, the openings 59 being provided in the partition 44 to establish communication between both portions of the compartment 55 on opposite sides of said partition. Also an opening 60 is provided adjacent the upper-most portion of the partition 44 located between the two parts of the compartment 55 to prevent air from trapping in said compartment during either the filling or the discharge of the liquid from the tank, the filling being accomplished through suitable domes 61 provided on the compartments.

Any form of discharge means may be provided for the tank, a tunnel type of discharge being shown, the tunnel member 62 being welded to the bottom of the tank and extending from forwardly of the rear-most wall of the compartment 55 to closely adjacent the rear head 40 of the tank, and having sloping bottom walls 62 and 64 leading to the discharge opening 65. The discharge openings 66 from the compartments into the tunnel 62 are located at the ends of the compartments that are lower-most, to thus provide complete drainage of said compartments, a suitable sump 67 being also preferably provided adjacent each discharge opening 66 to assure complete drainage of each of the compartments of the tank. Valves 68, suitably operated, control the flow through the openings 66. The tunnel 62 is welded not only to the tank shell on the bottom side thereof, but also to the extensions 45 constituting the transverse bracing members of the framework. Thus the discharge member 62 serves to brace the framework, while the transverse members of the framework also serve to steady and brace the tunnel or discharge member 62. If desired, the rear end of the tank may be provided with a bucket-box 69, or any other suitable receptacle at the rear thereof, should this be desired. A hand rail 70 is also shown as being provided on the tank vehicle. The internal longitudinally extending bracing plates 49 are provided with cut-outs or openings 72 in the bottom edges thereof, at least one of the openings 72 in each plate-like member 49 being located at the lower end portion of each of said plate-like members to prevent trapping of fluid in the compartments by said plate-like members.

Preferably, the semi-trailer tank vehicle is provided with a skirting in order to improve the appearance thereof and hide the inclined bottom portion of the tank from view, and at the same time serve as a housing for suitable receptacles or containers, and also to provide a running board along the side of the tank so that ready access can be had to the fill plugs 71 provided in the domes 61. The lateral extensions 47 of the head 40 and of the partitions 44 are utilized for supporting the housing comprising the skirting and a running board. At the rear of the tank, that is, at the head 40, the end walls 75 of the housings are secured directly to the brackets formed by the lateral extensions 47 of the said end wall 40, any suitable fastening elements, such as the bolts 76, being utilized.

It is preferred that the housing structure be removable as a unit from the side of the tank. The same arrangement is utilized wherever a partition and transverse end wall in the housing align. Thus the forward-most partition 44 may be similarly utilized to support the forward end of the housing, which at that point, constitutes merely a running board 77 and the upper skirting portion 78. Where a compartment is provided for receptacles, such as that shown having the doors 79 in Fig. 1, and the end walls of this compartment for receptacles or other purposes, do not line up with the partitions, the angle brackets 80 are utilized for supporting the running board and the skirting. The end walls or partitions 75 in the skirting are welded to the running board 77 and upper skirting portion 78. At the point where the angle brackets 80 are utilized the skirting 78 merely hangs from the running board 77, the running board being welded to the laterally extending portion 81 of each bracket 80. The brackets 80 are secured by the bolts 76, or other similar securing means, to the lateral extensions 47 to thus provide the detachable connection between the housing and the tank body. The skirting comprises the upper portion 78, which is integral with the running board 77 and which is preferably provided with a pair of beads 82 to give the same a finished appearance, and with a lower portion comprising the portions 83, and the doors 79. The doors 79 extend to the upper bead 82 and are provided with beads 82 thereon aligning with the lower bead 82 on the skirting portion 78. The portions 83 are preferably detachably mounted on the upper portion 78 by being bolted to a depending flange 84 thereon, although the same may be welded thereto, should this be desired. The portions 83 of the skirting are provided with curved edges adjacent the wheels 32 and 34, respectively, and with mud guards 85 at said curved edge portions.

The top of the running board is preferably corrugated, as will be evident from Fig. 4, and has a slightly upwardly inclined portion 86 adjacent the shell of the tank to shed water and throw the water outwardly from the shell of the tank toward the outer lateral edge of the running board. The running board 77 constituting the top edge of the skirting, is parallel, or substantially parallel, to the top edge 41 of the tank and engages the shell of the tank slightly above the junction of the upper uniformly curved portion and the lower tapering portion. Thus it will be obvious that the tank appears to be of the same contour from end to end thereof, inasmuch as the inclined bottom 38 of the tank is hidden throughout the length thereof by the skirting. Also the mounting for the fifth wheel is partially hidden by the skirting. The skirting has a curved forward end portion 87 corresponding substantially in curvature to the forward head 39 of the tank body.

The compartment in the housing having the doors 79 may be provided with a bottom 88, which may have an inclined wall portion 89, which may be welded to a flange 90 on the partition members 91 forming the ends of the compartment. If the compartment is used as a barrel carrier, a wooden bottom 92 may be placed on the bottom 88. The partition members 91 and the partitions or transverse walls 75 have marginal flanges 93 on the top and outer side edges thereof for welding said members 75 and 91 to the running board 77 and skirting portion 78.

While a vehicle is shown in Figs. 1 to 6, inclusive, that has separate compartments in the tank portion thereof and that has internal bracing means for said tank comprising the partitions separating the compartments and additional longitudinal internal bracing means, and suitable external transverse and longitudinal bracing means, the invention is also shown as being applied to other forms of tanks that do not have both external and internal bracing, the inherent strength of the tubular body portion being sufficient in the case where a body of relatively heavier gauge metal and of less than the maximum capacity under the road laws of the various states, is utilized, that all the bracing means shown in Figs. 1 to 6, inclusive, are not always necessary.

One particularly advantageous type of body to which the invention can be applied is shown in Figs. 7 to 11, inclusive. In this form of the invention the body is mounted as a semi-trailer, and is provided with a support comprising the pulling vehicle and trailer wheels, the rear wheeled support, or rear wheel assembly, being made in substantially the same manner as previously described. The tank body in this form of the invention comprises an inner shell 100 and an outer shell 101, between which insulating material 102 is provided. The weight is divided between the shells 100 and 101, and these are spaced substantially an equal distance apart throughout the length thereof and are made of substantially the same gauge metal, although the inner shell 100 may be made of a different character of material than the outer shell 101, particularly where milk, or other liquids, are carried within the inner shell 100, that might attack the material of the inner shell, or that might be attacked or affected by the material of the inner shell. Thus the inner shell may be made of Monel metal, or a non-corrosive alloy of steel, as may be desired. In the form of the invention shown in Figs. 7 to 11, inclusive, there are no internal bracing means whatsoever within the inner shell 100.

Bracing means are, however, provided between the inner shell 100 and the outer shell 101, said bracing means being preferably integrally united with said shells so as to make a unit of the inner and outer shells and said bracing means. Said bracing means are spaced at desired points along the length of the tank body and each bracing means comprises an angle member 103, which is curved to conform to the curvature of the upper portion of the tank, and has the inner edge portion of one leg thereof welded to the shell 100 and the other leg thereof welded to the outer shell 101. The outer shell is, of course, made up of a plurality of sheets, and the joints are preferably provided at 104 with the legs of the angles 103 underlying the same, the sheets and said legs of the angle at each joint being welded into a unit at the points 104. Certain of the angles 103 have substantially straight downward extensions 105, which extend out through the outer shell 101 at the lower portion of the tank and serve as a portion of the supporting means or integral framework for the tank. Each bracing means further comprises an angle member 106 curved to the contour of the lower portion of the tank and with the ends thereof slightly overlapping the angle 103 where it leaves the contour of the tank. The transverse leg of the angle 106 is welded to the outer face of the inner shell 100, and the vertical portion of the angle 106 extends only to the outer shell 101, except at the fifth wheel structure where larger angles 106 are provided which extend through the shell 101. The angles 103 that are provided at the fifth wheel structure do not have the downward extensions 105. In order to provide a good joint between the angles 103 and 106, a bracing plate 107 is welded to these angles at the joints between said angles 103 and 106, and to the shells 100 and 101.

The shell portion 100 and the shell portion 101 are each of such a shape that the bottom 108 of the inner shell and the bottom 109 of the outer shell are inclined, or sloped downwardly, from the forward head 110 of the inner shell and the rounded front end 111 of the outer shell, to the rear head 112 and the rear head 113 of the inner and outer shells, respectively. The inclination or slope of the bottom portion 108 and the bottom portion 109, is uniform from front to rear of the tank, while the top edge or uppermost portion 114 of the shell 100 and the top edge or uppermost portion 115 of the shell 101, are normally horizontal, or at the same height from the supporting surface on which the wheels 32 and 34 are mounted, such as the roadway, over the entire length of the tank. Upon reference to Fig. 8 it will be seen that the rear ends of the shell portions 100 and 101 are circular, the rear head 113 being circular in contour, and the shells 100 and 101 thus being substantially true cylinders at or near the edge portions where these join the head 112 and the head 113. This is only true at the rearmost end of the tank, as the contour of the shell portion changes constantly until the front end of the tank is reached. At the point where the shell portion 100 joins with the head 110 the upper portion of the tank is substantially semi-cylindrical in contour, while the lower portion thereof is substantially semi-elliptical. The maximum transverse dimension of the tank is, however, the same from end to end thereof, being equal to the transverse diameter of the shell portion 101 at the rear end thereof, while the internal diameter of the tank at its point of maximum width is substantially equal to the diameter of the shell portion 100 at the rear end of the tank. Thus the upper portion of the tank is of the same contour throughout the length thereof, having the same radius of curvature throughout all cross sections thereof from end to end of the tank, but the lower portion thereof changes in contour constantly from rear to front thereof, being substantially semi-elliptical at all cross sections except at the rear end of the tank, the horizontal axis of said elliptical cross sections being the same at any point along said tank but the vertical axis thereof decreasing uniformly from the rear to the front of said tank, so as to provide a tubular body of convex transverse curvature at any point of the body where a transverse section thereof may be taken, giving the full benefit of such tubular convexity at all points in the length of the tank body in providing strength therefor, and also providing a gradually sloping bottom for the tank on the interior thereof, whereby complete drainage, with a smooth surface for the interior of the tank, is obtained.

Figure 7:
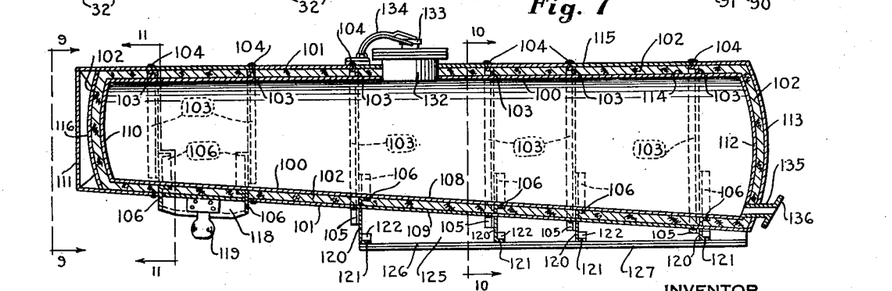
Fig. 7 is a longitudinal sectional view of a double shell tank vehicle embodying my invention, the skirting being omitted.
Figures 10, 11:
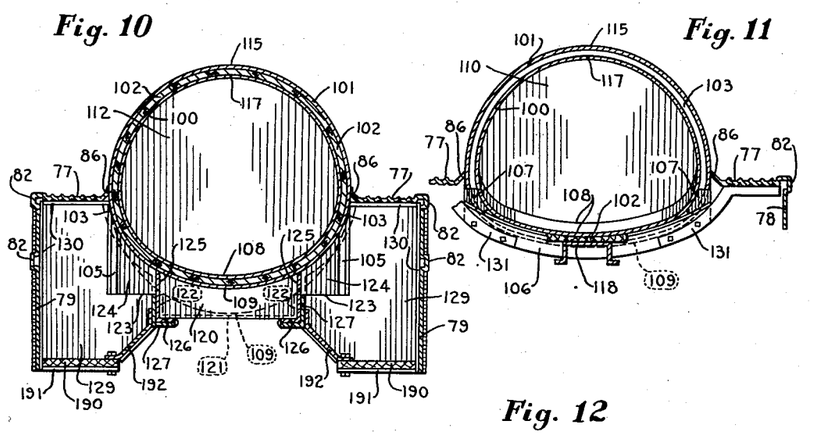
Fig. 10 is a section taken on a plane corresponding to the line 10—10 of Fig. 7, on an enlarged scale, but showing the skirting on the tank.
Fig. 11 is a section taken on a plane corresponding to the line 11—11 of Fig. 7, on an enlarged scale, showing the skirting, which is partly broken away.

The front head 110, integrally united with the inner shell portion 100, is slightly dished, as will be evident from Fig. 7. The rear head 112, which is welded integral with the shell portion 100, is also slightly dished, as indicated in Fig. 7. The outer head 113 is also integrally united with the outer shell 101, and is dished in substantially the same manner as the head 112. The outer forward head 111 is rounded, the same being curved about a center corresponding substantially to the axis of rotation of the fifth wheel structure, supporting the forward end of the tank body. A small narrow space is thus provided at the forward end of the tank, the tank thus having a better and more finished appearance than would otherwise be the case, but the advantage of having a smooth contour with a strong head for the tank at both ends thereof, is not lost, as the slightly dished head has the advantage of providing smoother joints between the shell portion 100 and said head, than would otherwise be the case, without any recesses or pockets at the joints that might be hard to clean, and at the same time provides maximum strength at this point.

The insulation 102 extends around the inner head 110, and an outer metallic sheath 116 is provided, which is fixed to the outer shell portion 101, which holds the insulating material 102 in position in the head end of the tank. The shell of the tank is made up of shell portions, or sections, each curved to a partly elliptical and partly cylindrical contour to provide the shape of the tank above described, that are welded together, this being necessary due to the fact that sheets of such size as to make the entire tank body do not exist. The joints between the sections of the inner shell are not shown. These are welded and ground down to make an absolutely smooth joint. The joints between the sections of the outer shell are clearly shown in Fig. 7 and have been previously described. Any joints in the inner shell 100 are preferably located adjacent the top thereof, as indicated at 117, so that if any damage to the tank should occur there would be no leakage at a longitudinal seam, due to the fact that these would be located in the top of the tank.

Mounted between the angles 106 that are provided at the forward end of the tank, is a fifth wheel supporting structure comprising a longitudinally extending channel member 118 that is welded, or secured in a similar manner, to the angles 106 at the ends thereof to thus provide a mounting for the upper portion of the fifth wheel, which may be of any desired form, but which is shown as being a ball-like head 119 in Fig. 7. The mounting of the fifth wheel being aligned with the angle members 103 thus provides a rigid mounting for the forward end of the tank on said fifth wheel device.

Aligning substantially with each of the angle members 103 and the angle members 106 from the rear end of the tank to a point forwardly as far as possible for clearance to still be provided for the wheels 32 in the turning of the vehicle, are the transversely extending saddle plates 120. As will be evident from Fig. 7, these vary in height from the front to the rear of the tank, so that the tallest saddle member 120 is at the forward-most point where one of these can be provided in order not to interfere with the turning of the wheels 32, and the shortest one nearest the rear end of the tank. The saddle members 120 are each provided with a bottom flange 121 extending along said bottom edge to the vertical edges where lateral vertical flanges 122 are provided on the saddle members 120. Said flanges 122 extend only to an offset 123 in said saddle member, whereby said saddle members are each provided with a wider portion 124, forming side wings on said saddle members 120, the upper portion of each saddle member being curved to the contour of the outer shell 101 at the lower portion 109 thereof and welded thereto. Said saddle members are also welded adjacent the outer lateral extremities of the wing portions 124 to the vertical portions 105 of the angle members 103, thus providing, with portions of said angle members, the transverse elements of an integral bracing means and vehicle frame provided on said tank. Said integral frame and bracing means further comprises the longitudinally extending bracing means 125, which extend to the shell portion 101 at the bottom part 109 thereof, and are welded thereto. Said longitudinally extending bracing members 125 are also welded to the saddle members 120 and terminate at the forward-most saddle member 120 so that there will be no interference with the proper turning of the wheels 32 when the trailer assumes an angular position relative to the pulling vehicle about the axis of the fifth wheel. The longitudinally extending bracing members 125 are also provided with flanges 126 thereon that underlie the flanges 121 on the saddle members 120 and are welded thereto.

In order to further strengthen and brace the tank body and the vehicle frame formed by the bracing means for the tank body, additional angle members 127 may be provided that are welded to the angular plates 125. The plates 125 of course, increase gradually in height toward the front thereof from the rear ends thereof so as to provide a horizontal mounting for the rear wheeled support, or in other words, the bottom edge of the bracing structure thus provided is parallel to the top edge of the tank body throughout the length of said bracing means. This also provides the stiffest and strongest portion of said bracing means adjacent the forward terminus thereof, thus providing, with said double shell structure, ample support for the tank body between the fifth wheel mounting and said longitudinally extending bracing means for the rear portion of the tank, due to the fact that said tank body has a certain amount of inherent strength therein, due to the tubular, transversely convex, character thereof, for the reasons previously mentioned.

The tank vehicle is preferably provided with a skirting and a running board, similar to that previously described, the same reference numerals being applied to the parts thereof in Figs. 7, 8, 9, 10 and 11 as are applied to the corresponding parts in the previously described forms of the invention shown in Figs. 1 to 6, inclusive. The skirting may be provided with doors 79 in the same manner as previously described, these extending to adjacent the top bead 82, the skirting being supported by means of the partition plates 129, which are either welded or bolted to the wings 124 on the saddle members, and which have flanges 130 thereon that are welded to the vertical portions 78 and the running board portions 77 of said skirting. The portion of the skirting having the doors 79 constitutes a storage compartment having a wooden bottom 190 mounted on the bottom flanges 191 of the partitions 129. Inclined dust guards 192 are welded to the members 127 and secured to the top of the member 190 by any suitable fastening elements. Angle brackets 131 may be welded or bolted on any of the members 106 where no partition sheets 129 can be provided, such as the angle members 106 at the fifth wheel structure, said angle brackets having the running board 77 welded thereto and the skirting 78 depending therefrom.

The tank is preferably provided with a dome 132, through which the same is filled, a closure member 133 being suitably mounted on suitable closure operating means 134, which also serve to clamp the closure member in liquid-tight position on the dome. The discharge of liquid from the tank is accomplished through the discharge connection 135, which is located at the rear of the tank at the lower-most portion of the head 112 and at the center line of the bottom 108 to completely drain the tank, and a flange 136 is provided on said outlet connection 135 for securing any suitable valve thereto.

The tank body shown in Figs. 7 to 11, inclusive, is particularly adapted for use in transporting liquids that are to be kept at an even temperature, such as milk, and is particularly constructed so as to avoid all sharp corners or recesses therein, and to provide a smooth rounded contour in the tank from end to end thereof, and so as to provide complete drainage therefore so that the same can be emptied completely of milk and can be thoroughly cleaned and sterilized on the interior thereof after the milk has been emptied therefrom. In this form of tank the skirting is again provided in order to give a pleasing contour to the vehicle and to create the impression on the eye of the observer that the vehicle is of the same contour from end to end thereof, said skirting hiding the lower portion of the tank having the inclined bottom, due to the fact that it extends from substantially the point of greatest maximum width of the tank body downwardly to a point below said inclined bottom, from end to end of the tank. It also tends to hide the fifth wheel structure, and creates the impression that the trailer tank is a unit with the pulling vehicle. The top of the skirting, which constitutes the running board 77, is substantially parallel to the top edge 115 of the tank body throughout the length of the same. While the running board 77 may be located at any point above the maximum transverse diameter of the tank, it cannot be located so as to join the shell of the tank very much below this point and still obtain the desired finished appearance for the tank vehicle. The inclined inner edge portion 86 of the running board can, however, be made of such slope and extent as to bring the point of engagement thereof with the tank shell at substantially the point where the maximum transverse diameter of the tank body exists. Thus some leeway is provided for the location of the running board and the skirting, without detracting from the appearance of the tank, as a whole.

While the tank vehicle described above has a double shell and has bracing means that are internal, relative to the outer shell, but external, relative to the inner shell, and bracing means that are external both relative to the inner and outer shells, the principle of my invention can be applied to tank bodies, comprising portions of tank vehicles that have only external bracing means, or only internal bracing means and that have only single shells, and also the shape of these tank bodies in transverse section can be varied considerably and still many of the advantages of the invention shown in Figs. 1 to 11, inclusive, can be obtained.

Figure 12:
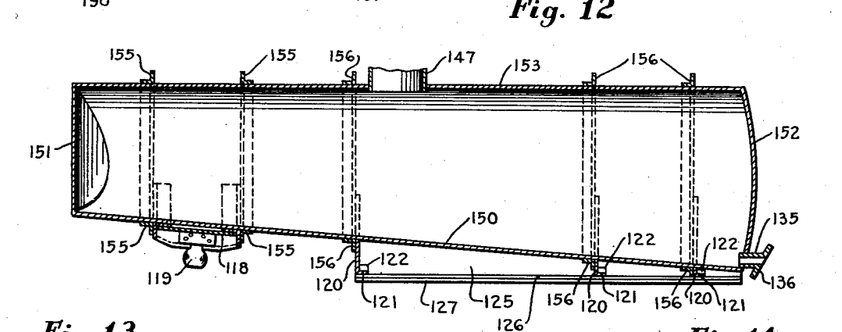
Fig. 12 is a longitudinal sectional view of a vehicle tank, showing a further modification.
Figures 13, 14:
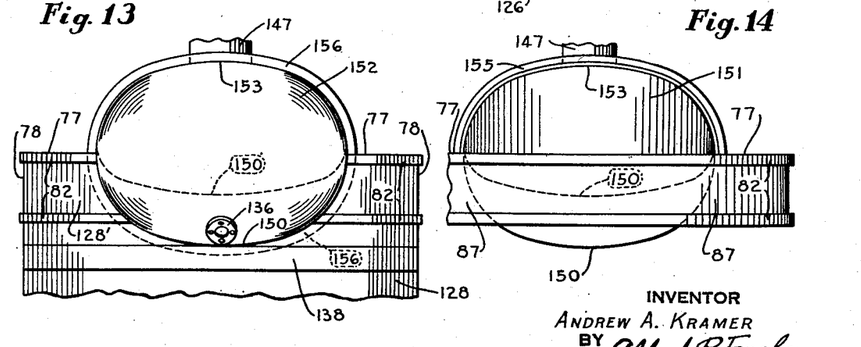
Fig. 13 is a rear elevational view, partly broken away, of a vehicle utilizing the form of tank shown in Fig. 12.
Fig. 14 is a front elevational view, partly broken away, of the vehicle utilizing the tank shown in Fig. 12.

If it is desired to obtain a uniform contour for the upper portion of a tank that is elliptical in cross section, this can be obtained by forming the tank as shown in Figs. 12 to 14, inclusive, it being, of course, understood that this tank body is mounted in substantially the same manner as previously described, and that a skirting cooperates with the same in substantially the same manner as has been previously described. In the form of the invention shown in Figs. 12, 13 and 14, the bottom 150 of the shell portion of the tank slopes downwardly continuously from the front head 151, which is transversely curved, to the rear head 152. External reinforcing members 155 and 156 of hoop-like character welded to the shell of the tank, made in the form of angles, are provided, these being connected with the fifth wheel carrying member 118 and the external transverse and longitudinally extending bracing means 120 and 125 in the same manner as previously described. The head 151 is curved substantially about the axis of the fifth wheel. Any number of domes 147 may be provided on the tank, and the outlet connection 135 may be provided at the rear end thereof. In this form of the invention the upper portion of the tank is of the same contour throughout, being a semi-ellipse, of the same curvature at all points along the upper portion of the tank body. The lower portion of the tank body, however, tapers continuously from the rear to the front end thereof, and while the same is also a semi-ellipse in cross section at all points thereof, this ellipse changes in contour so that while the major axis thereof remains the same, the minor axis continuously decreases from the rear end of the tank to the front end of the tank, as will be evident by comparison of Figs. 13 and 14. Thus, while the major transverse dimension of the tank is the major axis of the semi-elliptical upper portion of the tank at any point along the length of the tank, and the major transverse dimension of the tank is the major axis of the semi-elliptical lower portion of the tank at any point along the length thereof, it is only at the rear end of the tank that the cross section of the tank is a true ellipse, with the same major and minor axis for both the upper and lower portions thereof. However, due to the provision of the skirting on the tank, the sloping bottom 150 will be hidden and the top edge 153 of the tank will be parallel to the top 77 of the skirting, and parallel to the bottom edge of the bracing means 125, and thus parallel to the supporting surface upon which the vehicle may be mounted, the tank and skirting thus causing the tank to have the appearance of a tank that is of the same major and minor transverse axes throughout, without any indication from a side or end view thereof, when in operation, that there is a sloping bottom to the tank or that the contour thereof varies, as the skirting extends so as to hide all that portion of the tank that has a variation in the contour thereof, from view.

While the invention is shown as being applied to trailer tanks only, in connection with which it has peculiar advantages which have been pointed out above, the same can also be utilized in connection with truck tanks utilized for various purposes, such as the transportation of milk, for example, wherein no sharp offsets in the tank are desired and where perfect drainage is wanted. By a truck tank is meant one that is mounted entirely on one vehicle, and not partly on a pulling vehicle and partly on a trailer vehicle, as in the forms of the invention illustrated.

In all of the forms of the invention illustrated, it is to be understood that the reinforcing elements, whether transverse or longitudinal, or whether internally or externally of the tank, are welded to the shell of the tank so as to be integral therewith. Of course, this is true of all reinforcing elements that contact the shell of the tank. Those reinforcing elements that do not contact the shell of the tank, but contact other reinforcing elements, are welded to such other reinforcing elements. Furthermore the transverse reinforcing elements and the longitudinal reinforcing elements are welded to each other at their points of engagement, to thus make the reinforcing means integral with the tank shell, whether the same are internally of the shell or externally of the shell, or between the shells. Certain of the reinforcing elements in certain of the forms of the invention also constitute a combined integral tank bracing means and vehicle framework. There is, however no intention of limiting the invention to such integrally welded structure.

Figures 5, 6, 8, 9:
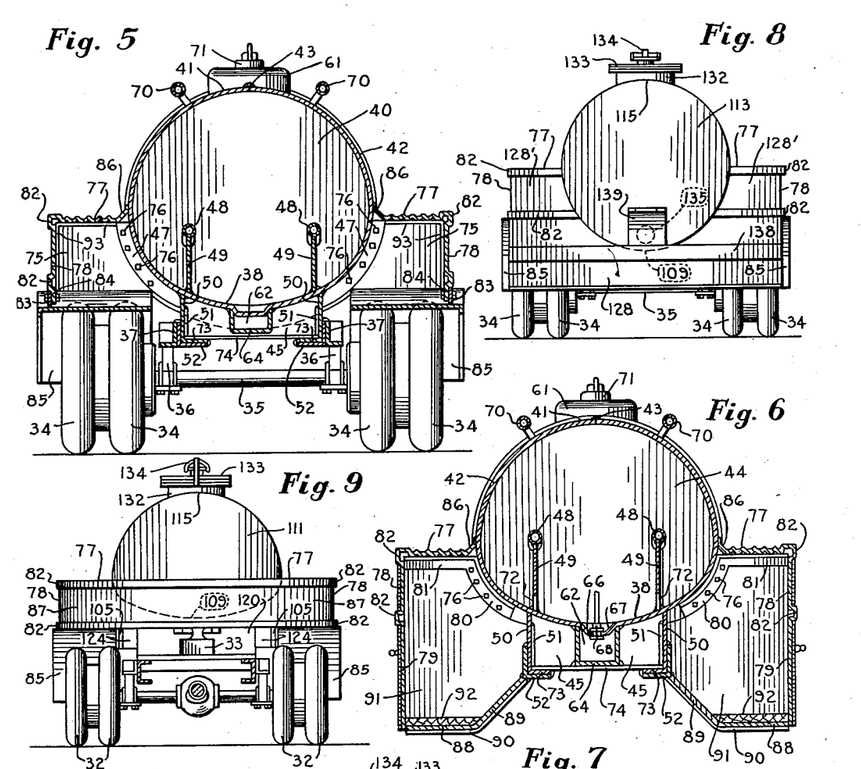
Fig. 5 is a section taken on the line 5—5 of Fig. 1, on an enlarged scale.
Fig. 6 is a section taken on the line 6—6 of Fig. 1, on an enlarged scale.
Fig. 8 is a rear elevation of the tank shown in Fig. 7 having a skirting applied thereto.
Fig. 9 is a front elevation thereof, taken substantially from the point indicated by the line 9—9 of Fig. 7, with portions of the pulling vehicle in section.

In both the form of the invention shown in Figs. 7 to 11, inclusive, and that shown in Figs. 12 to 14, inclusive, the rear end of the vehicle may be finished off by a transverse rear skirting portion 128 integrally united with the longitudinally extending skirting portions 78, which has an upper panel 128' and has beads 82 thereon to provide a similar appearance for the rear portion of the skirting to that of the side portions thereof, the skirting being substantially flush with the rear head of the outer shell portion 113 of the tank in the form of the invention shown in Fig. 8, and substantially flush with the rear head 152 in the tank shown in Fig. 13. A bumper 138 may also be provided to protect any projecting parts, such as the outlet connection at the rear end of the vehicle, and if desired, a housing may be provided for the outlet connection and any valve means provided therefor, such as that shown at 139 in Fig. 8, the housing being provided with any suitable lock, if desired, to prevent access to any valve means that may be provided therein.

What I claim is:

1. In a tank vehicle, a transversely curved elongated tank body tapering gradually longitudinally of said vehicle from one end thereof to the other end thereof, the cross-sectional shape of said tank body varying progressively from the greater end thereof to the lesser end thereof to provide a transversely curved bottom portion on said tank body sloping gradually downwardly from the lesser end thereof to the greater end thereof, the wall of said tank body being curved transversely throughout any cross section thereof from end to end of said tank body, and reinforcing means for said tank body comprising longitudinally extending external bracing members under said body extending forwardly from the greater end of said body, said longitudinally extending bracing members increasing gradually in height from the rear ends thereof to the forward ends thereof.

2. In a tank vehicle, a transversely curved elongated tank body tapering gradually longitudinally of said vehicle from one end thereof to the other end thereof, the cross-sectional shape of said tank body varying progressively from the greater end thereof to the lesser end thereof to provide a transversely curved bottom portion on said tank body sloping gradually downwardly from the lesser end thereof to the greater end thereof, the wall of said tank body being curved transversely throughout any cross section thereof from end to end of said tank body, and reinforcing means for said tank body comprising longitudinally extending external bracing members under said body extending forwardly from the greater end of said body, said longitudinally extending bracing members increasing gradually in height from the rear ends thereof to the forward ends thereof, and transversely extending bracing members extending between said longitudinally extending bracing members, and increasing in height toward the lesser end of said tank body.

3. In a tank vehicle, a transversely curved elongated tank body tapering gradually longitudinally of said vehicle from one end thereof to the other end thereof, the cross-sectional shape of said tank body varying progressively from the greater end thereof to the lesser end thereof to provide a transversely curved bottom portion on said tank body sloping gradually downwardly from the lesser end thereof to the greater end thereof, the wall of said tank body being curved transversely throughout any cross section thereof from end to end of said tank body, and external reinforcing means for said tank body secured to the under side thereof and extending from the greater end of said tank body forwardly a substantial distance, said reinforcing means comprising longitudinally and transversely extending members, the bottom longitudinal edge of said reinforcing means and the top longitudinal edge of said tank body being substantially parallel.

4. In a tank vehicle, a transversely curved elongated tank body tapering gradually longitudinally of said vehicle from one end thereof to the other end thereof, the cross-sectional shape of said tank body varying progressively from the greater end thereof to the lesser end thereof to provide a transversely curved bottom portion on said tank body sloping gradually downwardly from the lesser end thereof to the greater end thereof, the wall of said tank body being curved transversely throughout any cross section thereof from end to end of said tank body, said tank body comprising inner and outer shells of corresponding transverse curvature from end to end thereof, and reinforcing means for said tank body comprising longitudinally extending external bracing members under said body extending forwardly from the greater end of said body, ring-like bracing members between said shells, and transverse external bracing members having transversely curved portions engaging said outer shell, said transverse and longitudinal external bracing members being secured together, and said bracing means increasing gradually in height from the rear end thereof to the forward end thereof.

ANDREW A. KRAMER.